United States Patent
Li et al.

(10) Patent No.: US 7,305,152 B1
(45) Date of Patent: Dec. 4, 2007

(54) ATTENUATING COUNTER-PROPAGATING OPTICAL PHASE MODULATION

(75) Inventors: Yifei Li, Norwood, PA (US); Peter Herczfeld, Bala Cynwyd, PA (US)

(73) Assignee: Drexel University, Philadelphia, PA (US)

(*) Notice: Subject to any disclaimer, the term of this patent is extended or adjusted under 35 U.S.C. 154(b) by 0 days.

(21) Appl. No.: 11/445,820

(22) Filed: Jun. 2, 2006

(51) Int. Cl.
*G02F 1/035* (2006.01)
(52) U.S. Cl. .............................................. 385/3; 385/2
(58) Field of Classification Search ................ 385/2–3, 385/14–15, 131–132
See application file for complete search history.

(56) References Cited

U.S. PATENT DOCUMENTS 3,313,938 A * 4/1967 Peters ......................... 359/247
3,393,954 A * 7/1968 Enderby et al. ............... 385/2
4,208,091 A * 6/1980 Cheo et al. .................... 385/3

OTHER PUBLICATIONS

Ackerman, E.I., "Broadband Linearization of a March-Zehnder Electro-Optic Modulator", *IEEE MTT-S Digest*, 1999, 999-1002, no month.
Ackerman, E.I. et al. "Effect of Pilot Tone-Based Modulator Bias Control on External Modulation Link Performance", *IEEE*, 2000, 121-124, no month.
Betts, G.E., "Linearized Modulator for Suboctave-Bandpass Optical Analog Links", *IEEE Transactions on Microwave Theory and Techniques*, 1994, 42(12), 2642-2649, Dec. 1994.
Chiu, Y. et al., "Broad-Band Electronic Linearizer for Externally Modulated Analog Fiber-Optic Links", *IEEE Photonics Technology Letters*, 1999, 11(1), 48-50, Jan. 1999.
Gopalakrishnan, G. K. et al., "Performance and Modeling of Broadband LiNbO3 Traveling Wave Optical Intensity Modulators", *Journal of Lightware Technology*, 1994, 12(10), 1807-1819, Oct. 1994.
Li, Y., "Receiver for a Coherent Fiber-Optic Link with High Dynamic Range and Low Noise Figure", *Center for Microwave-Lightwave Engineering, Drexel University*, 4 pages, no date available.
Li, X. t al., "High-Saturation-Current InP-InGaAs Photodiode with Partially Depleted Absorber", *IEEE Photonics Technology Letters*, 2003, 15(9), 1276-1278, Sep. 2003.
Mitomi, O., "Low-Driving-Voltage LiNbO3 Optical Modulators with Millimeter-Wave Bandwidths", *IEEE*, 2005, 503 (1 page), no month.
Pappert, S.A. et al., "Microwave Fiber Optic Links for Shipboard Antenna Applications", *IEEE*, 2000, 345-348, no month.
Sandhwani, R. et al., "Adaptive CMOS Predistortion Linearizer for Fiber-Optic Links", *Journal of Lightwave Technology*, 2003, 3180-3193 vol. 21, No. 12, Dec. 2003.

(Continued)

*Primary Examiner*—Quyen P Leung
(74) *Attorney, Agent, or Firm*—Woodcock Washburn LLP

(57) ABSTRACT

An attenuating counter-propagating (ACP) optical phase modulator introduces zero propagation delay. An optical field is modulated by an electromagnetic field. Within the ACP modulator, the optical field is propagated in an opposite direction to the propagation direction of the electromagnetic field. The electromagnetic field is attenuated within the ACP modulator. In an example embodiment, the length of the modulator is greater than the attenuation length of the electromagnetic field.

22 Claims, 11 Drawing Sheets

OTHER PUBLICATIONS

Schaffner, J.H. et al., "Intermodulation Distortion in High Dynamic Range Microwave Fiber-Optic Links with Linearized Modulators", *Journal of Lightwave Technology*, 1993, 11(1), Jan. 3-6, 1993.

Westbrook, L.D. et al., "Method for Linearising Analogue DFB Lasers Using an Integrated MQW Electroabsorption Modulator", *Electronics Letters*, 1996, 32(2), 134-135, Jan. 1996.

Williams, K.J. et al., "Design Considerations for High-Current Photodetectors", *Journal of Lightwave Technology*, 1999, 17(8), 1443-1454, Aug. 1999.

Zhang, L. et al., "Low-Voltage High-Speed Travelling Wave InGaAsP-InP Phase Modulator", *IEEE Photonics Technology Letters*, 2004, 16(8), 1831-1833, Aug. 2004.

* cited by examiner

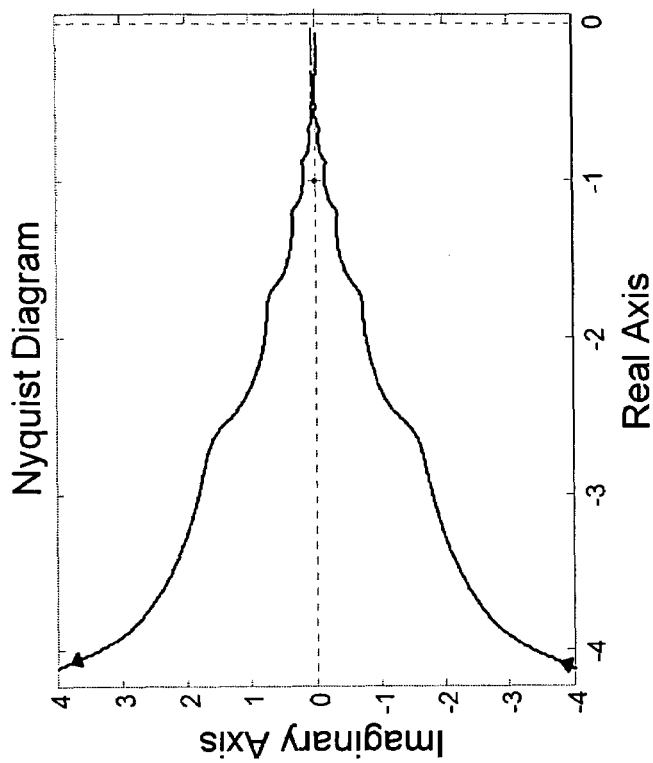
FIGURE 9B
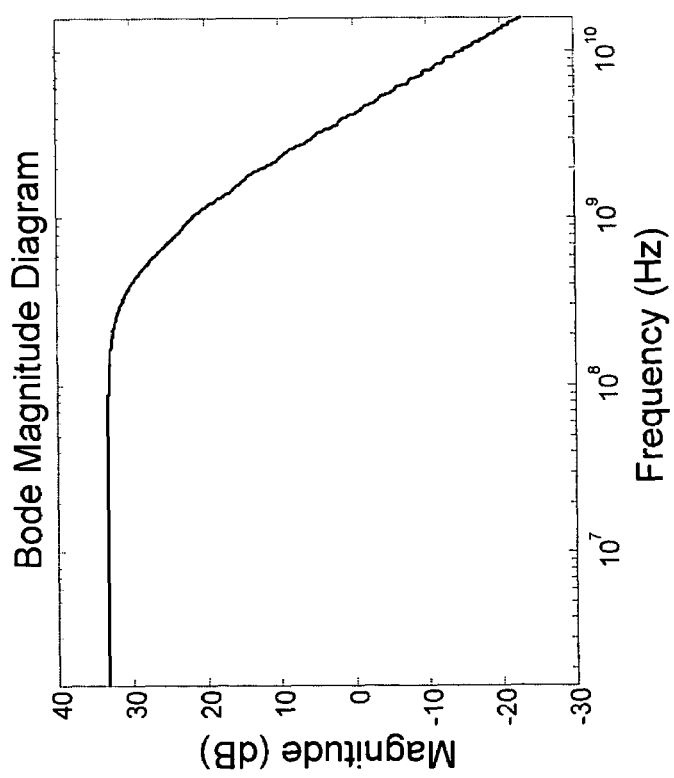
FIGURE 9A
FIGURE 9

ATTENUATING COUNTER-PROPAGATING OPTICAL PHASE MODULATION

TECHNICAL FIELD

The technical field generally relates to modulators and demodulators and more specifically relates to photonic phase locked loop phase modulators and demodulators.

BACKGROUND

Fiber-optics links are known to possess the qualities of high bandwidth, low attenuation, and good electromagnetic interference (EMI) immunity. Because of these qualities, signals can be modulated at high frequencies, such as microwave frequencies, and transmitted over fiber-optic links. Optical transmitters and optical receivers, modulate and demodulate, respectively, the optical signals. Conventional optical modulators and demodulators are known to be nonlinear over wide bandwidths due to the nonlinearity attributed to propagation delays. Thus, the very qualities that make fiber-optic links attractive are negated by the nonlinear characteristics of optical modulators and demodulators. That is, a phase modulated (PM) fiber optic link employing a photonic phase locked loop phase demodulator has intrinsic linear response. The photonic phase locked loop performs phase demodulation by tracking the optical phase of a phase modulated optical signal. Photonic phased locked loops thus demand small loop latency.

SUMMARY

This Summary is provided to introduce a selection of concepts in a simplified form. This Summary is not intended to be used to limit the scope of the claimed subject matter.

An optical phase modulator possessing no propagation delay includes an optical channel adjacent to an attenuating electrode. Optical energy is modulated by the electromagnetic energy. The modulator is in a counter propagating configuration. That is, the optical energy propagates along the optical channel in a direction opposite to the direction in which the electromagnetic energy propagates along the attenuating electrode. The electromagnetic energy is attenuated as it propagates along the attenuating electrode. In an example embodiment, the length of the modulator is greater than the attenuation length of the electromagnetic energy.

BRIEF DESCRIPTION OF THE DRAWINGS

The foregoing summary, as well as the following detailed description, is better understood when read in conjunction with the appended drawings.

FIG. 9 comprises a Bode magnitude diagram (FIG. 9A) and a Nyquist diagram (FIG. 9B) of the open loop gain of a PPLL comprising an ACP phase modulator.

DETAILED DESCRIPTION OF ILLUSTRATIVE EMBODIMENTS

Elimination of propagation delay in an electro-optic modulator is accomplished by configuring the modulator as a counter-propagating modulator, in which the optical energy propagates in an opposite direction to propagation direction of the electromagnetic energy. Further, the channel for carrying the electromagnetic energy, referred to as the electrode, is configured to attenuate the electromagnetic energy. The electro-optic modulator is referred to as an attenuating counter-propagating (ACP) phase demodulator. Moreover, the modulator is configured such that the length of the attenuator is greater than the attenuation length of the electromagnetic energy. In an example embodiment, the length of the attenuator is at least three times greater than the attenuation length of the electromagnetic energy.

Because the ACP phase modulator exhibits no propagation delay, it is ideally suited for applications in which propagation delay is not desired, such as a photonic phase locked loop phase demodulator, for example. The performance of photonic phase locked loop phase demodulators is detrimentally affected by propagation delay in the in-loop phase modulator. The ACP phase modulator, implemented in a photonic phase locked loop phase demodulator, provides zero propagation delay, and thus excellent photonic phase locked loop phase demodulator performance.

Figure 1:
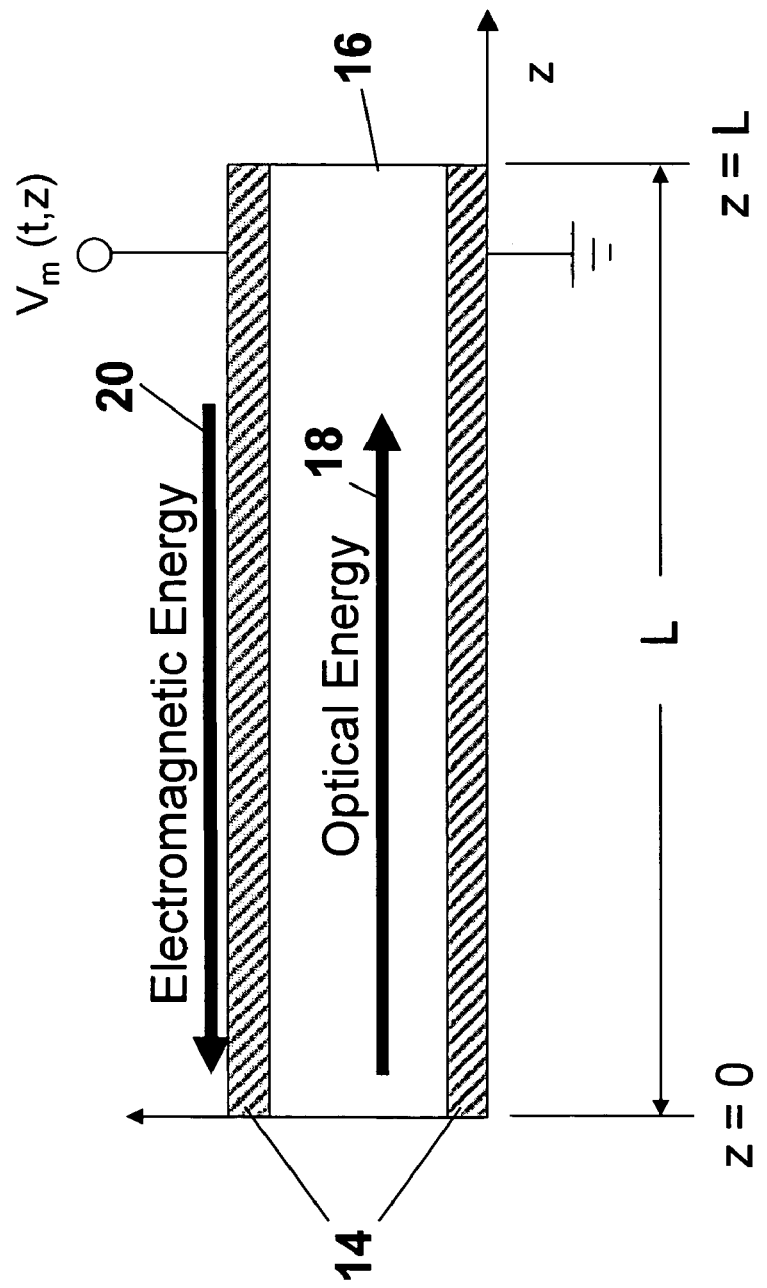
FIG. 1 is an illustration of an example electro-optic attenuating counter-propagation (ACP) phase modulator.

FIG. 1 is an illustration of an example electro-optic ACP phase modulator 12 comprising an optical channel 16 and an electromagnetic channel 14. The electromagnetic channel 14, referred to as the electrode, allows for propagation of electromagnetic energy. The optical channel 16 allows for propagation of optical energy 18. The optical channel can comprise any appropriate material, such as lithium niobate crystal, $LiNbO_3$, potassium titanium oxide phosphate, $KTiOPO_4$ (also referred to as KTP), lithium tantalate, $LiTaO_3$, and/or a semiconductor, for example.

The electromagnetic energy can comprise any appropriate electromagnetic energy. In an example embodiment, the electromagnetic energy comprises microwave energy. Generally, microwave energy refers to alternating current signals with frequencies between 300 MHz ($3\times10^8$ Hz) and 300 GHz ($3\times10^{11}$ Hz). As depicted, the ACP phase modulator 12 is configured for counter propagation. That is, the optical energy propagates in a direction 18 opposite to the propagation direction 20 of the electromagnetic energy. It is to be understood that the depiction of propagations directions 18 and 20 is relative. For example, each of the propagation directions 18 and 20 could be reversed and still be counter propagating.

The electrode 14 provides attenuation of the electromagnetic energy propagating therethrough. In an example embodiment, the length, L, of the ACP phase modulator 12 is at least three times greater than the attenuation length of the electromagnetic energy. The length, L, is the propagation distance traveled by the electromagnetic energy to modulate the optical energy. Attenuation length is the propagation distance traveled by the electromagnetic energy in which the amplitude of the electromagnetic energy is attenuated by a factor of 1/e (e.g., approximately 63%). The length, L, of the ACP phase modulator 12 can be greater than, less than, or equal to the attenuation length of the electromagnetic energy, however, as discussed in more detail below, lesser propagation delay is observed when the attenuation length of the electromagnetic energy is less than the length, L, of the ACP phase modulator 12.

In operation, the optical energy is capable of being modulated (modulateable) by the attenuated electromagnetic energy. The electrode 14 is adjacent to the optical channel 16. As the electromagnetic energy propagates along the electrode 14, the electromagnetic energy is attenuated, and the phase of the optical energy propagating along the optical channel 16 is modulated by the attenuated electromagnetic energy. As described herein, the electromagnetic energy is interchangeably referred to the microwave modulation field. Also, the optical energy is interchangeably referred to as the optical field. The microwave modulation field and the optical field enter at opposite ends of the ACP phase modulator 12. As depicted in FIG. 1, the microwave modulating field enters at the end of the ACP phase modulator 12, indicated at z=L and the optical field enters the end of the ACP phase modulator 12, indicated at z=0. The microwave modulation field can be expressed mathematically in the frequency domain by equation (1) below.

$$V_m(\omega,z) = V_m(\omega,z=L) \cdot e^{-\gamma_m(L-z)}, \tag{1}$$

where $\gamma_m$ represents the complex propagation constant of the electromagnetic field, defined as $$\gamma_{m=\alpha_m} + \frac{j\omega}{\mu_m},$$

where $\alpha_m$ represents the attenuation and $\mu_m$ represents the velocity of the microwave modulation field. In general, $\alpha_m$ and $\mu_m$ are functions of $\omega$, the modulation frequency. The variable z represents the length of the ACP phase modulator 12.

As previously mentioned, the propagation delay of the ACP phase modulator is zero. To determine the ACP phase modulator's 12 propagation delay, its transfer function is determined. Neglecting the transverse profile of the optical field within the optical channel 16, propagation of the optical energy can be described mathematically by equation (2).

$$\frac{\partial \xi(t,z)}{\partial t} + u \cdot \frac{\partial \xi(t,z)}{\partial z} = j \cdot \alpha \cdot V_m(t,z) \cdot \xi(t,z), \tag{2}$$

where $\xi(t, z)$ represents the optical field envelope as a function of time, t, and length, z, of the ACP phase modulator, $V_m(t)$ represents the modulation voltage, $\mu$ represents the speed of light inside the optical channel 16 of the ACP phase modulator 12, and a represents attenuation related to the electro-optic effect as described by equation (3) below.

$$\alpha = \omega_0 \cdot r \cdot n_0^2 / 2d, \tag{3}$$

where $\omega_0$ represents the optical frequency, $\eta_0$ represents the refractive index of the optical channel 16, r represents the electro-optic coefficient of the optical channel, and d represents the effective modulator thickness.

To solve equation (2), $\xi(t,z)$ is expressed in terms of phase and amplitude as shown in equation (4).

$$\xi(t,z) = A(t,z) \cdot e^{j \cdot \phi(t,z)}, \tag{4}$$

where A(t,z) represent the amplitude of the optical field envelope as a function of time, t, and length, z, of the ACP phase modulator, $e^{j\phi(t,z)}$ represent the phase of the optical field envelope as a function of time, t, and length, z, of the ACP phase modulator. Substituting equation (4) into equation (2) shows that only the phase of the optical signal is affected by the modulation, as can be seen in equation (5) and equation (6).

$$\frac{\partial A(t,z)}{\partial t} + u \cdot \frac{\partial A(t,z)}{\partial z} = 0 \tag{5}$$

$$\frac{\partial \phi(t,z)}{\partial t} + u \cdot \frac{\partial \phi(t,z)}{\partial z} = \alpha \cdot V_m(t,z), \tag{6}$$

The Fourier transform of equation (6) is determined to obtain the propagation equation for the optical phase in the frequency domain. The result is represented mathematically by equation (7).

$$\frac{\partial \phi(\omega,z)}{\partial z} + j\frac{\omega}{u} \cdot \phi(\omega,z) = \frac{\alpha}{u} \cdot V_m(\omega,z) \tag{7}$$

The transfer function of the ACP phase modulator 12 is obtained by substituting equation (1) into equation (7). The result is represented mathematically by equation (8).

$$H_{ACP}(\omega) = \frac{\phi(\omega, z=L)}{V_m(\omega, z=L)} = \frac{\alpha}{u} \cdot \frac{1 - e^{-(\gamma_m + j\omega/u)L}}{\gamma_m + j \cdot \omega/u} \tag{8}$$

In the simple case wherein no attenuation is introduced by the electrode 14 (represented mathematically as $\alpha_m$=0), equation (8) reduces to equation (9).

$$H_{ACP}(\omega) = \frac{\alpha L}{u} \cdot e^{-j\omega\tau_d} \cdot \frac{\sin(\omega\tau_d)}{\omega\tau_d}, \tag{9}$$

where $\tau_d$ represents the average traveling time of the optical field and the modulation field ($\tau_d$=(L/u+L/u$_m$)/2). The exponential phasor $e^{-j\omega\tau_d}$ represents a pure propagation delay equal to the average traveling time of the optical and the modulation fields. This phasor causes feedback instability in a photonic phase locked loop because as $\omega$ increases it induces unbounded phase lag that diminishes the photonic phase locked loop phase margin. The sensitivity of the ACP phase modulator 12 is ~αL/u. Minimizing propagation delay amounts to reducing L, which significantly diminishes sensitivity.

When attenuation is present and the length of the ACP phase modulator, L, approaches infinity, equation (8) reduces to equation (10), which resembles the response of a lumped-element low pass filter.

$$H_{ACP}(\omega) = \frac{\alpha \cdot L_a}{u} \cdot \frac{1}{1 + j \cdot \omega / \omega_{ACP}}, \quad (10)$$

where $L_a = 1/\alpha_m$ and represents the attenuation length of the modulation field, and $\omega_{ACP} = 1/(L_a/u_m + L_a/u)$, and represents the bandwidth of the ACP phase modulator.

This modulator response contains no phasor representing propagation delay. Thus, it is ideally suited for the applications demanding a tight propagation delay, such as a photonic phase locked loop. As the attenuation length, $L_a$, in equation (10) approaches infinity, the magnitude of the ACP phase modulator reaches maximum. In this limit, equation (10) reduces to equation (11) below, which resemble the response of an ideal frequency modulator.

$$H_{ACP}(\omega) = \frac{\alpha/(1 + u/u_m)}{j\omega} \quad (11)$$

Figure 2:
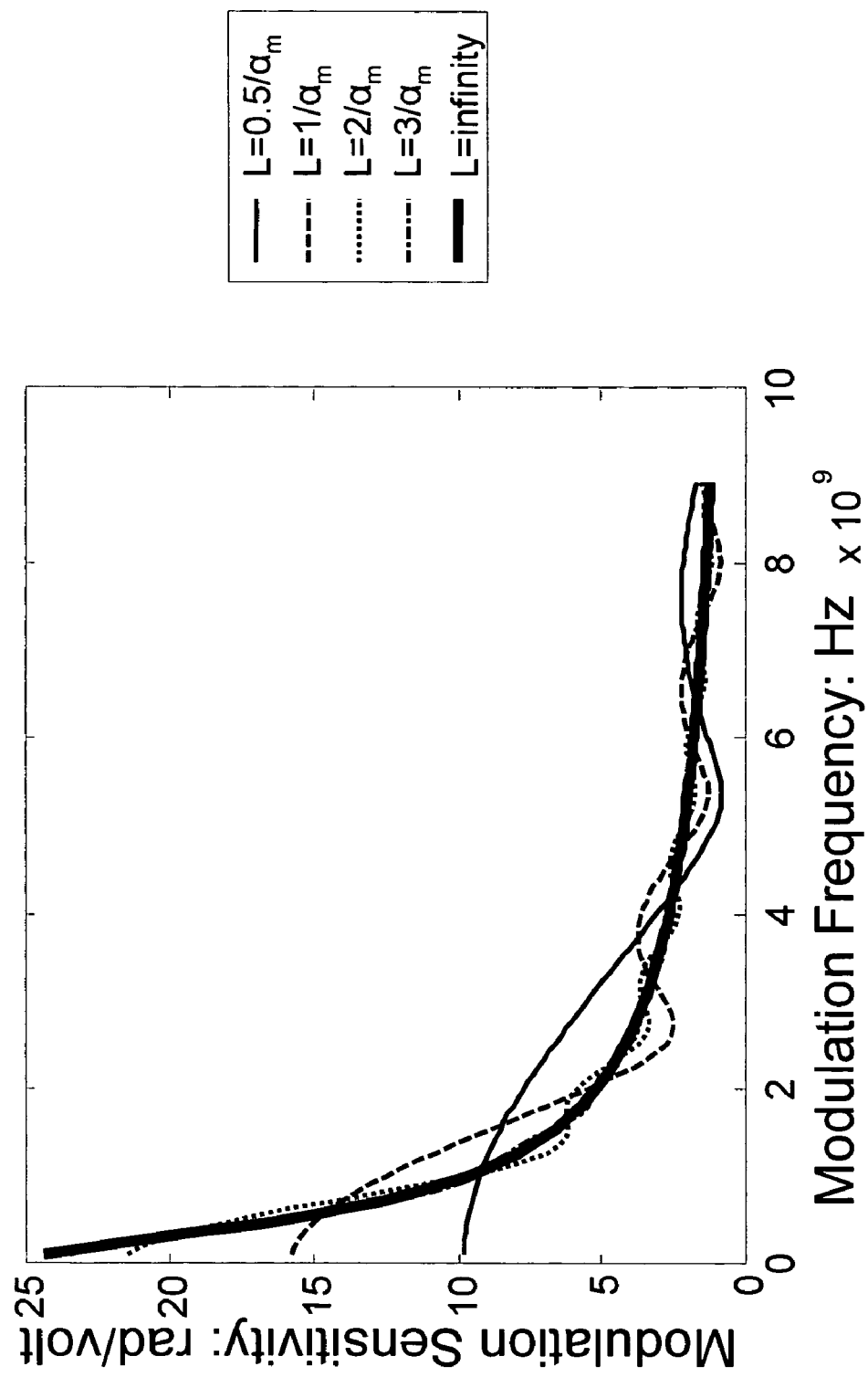
FIG. 2 is a graph of modulation sensitivity versus modulation frequency for various lengths of an example ACP phase modulator.

FIG. 2 is a graph of modulation sensitivity versus modulation frequency for various lengths, L, of an example ACP phase modulator. The modulation sensitivity is represented in radians/volt (rad/volt) and the frequency if represented in Hertz (Hz). The graph of FIG. 2 was calculated using a fixed value of attenuation, $\alpha_m$, equal to 50 NP/m (neepers per meter). The sensitivity was calculated for values of modulator length, L, equal to $L=0.5/\alpha_m$, $L=1/\alpha_m$, $L=2/\alpha_m$, $L=3/\alpha_m$, L=infinity. As can be seen in FIG. 2, the sensitivity exhibits a persistent oscillation at a period of $f_r = 1/2\tau_d$, which is referred to as the modulator resonance frequency. As the length, L, increases, the oscillation diminishes, and when $L > 3/\alpha_m$, the modulator response is nearly identical to the monotonically decaying shape of an ideal ACP modulator with infinite L.

Figure 3:
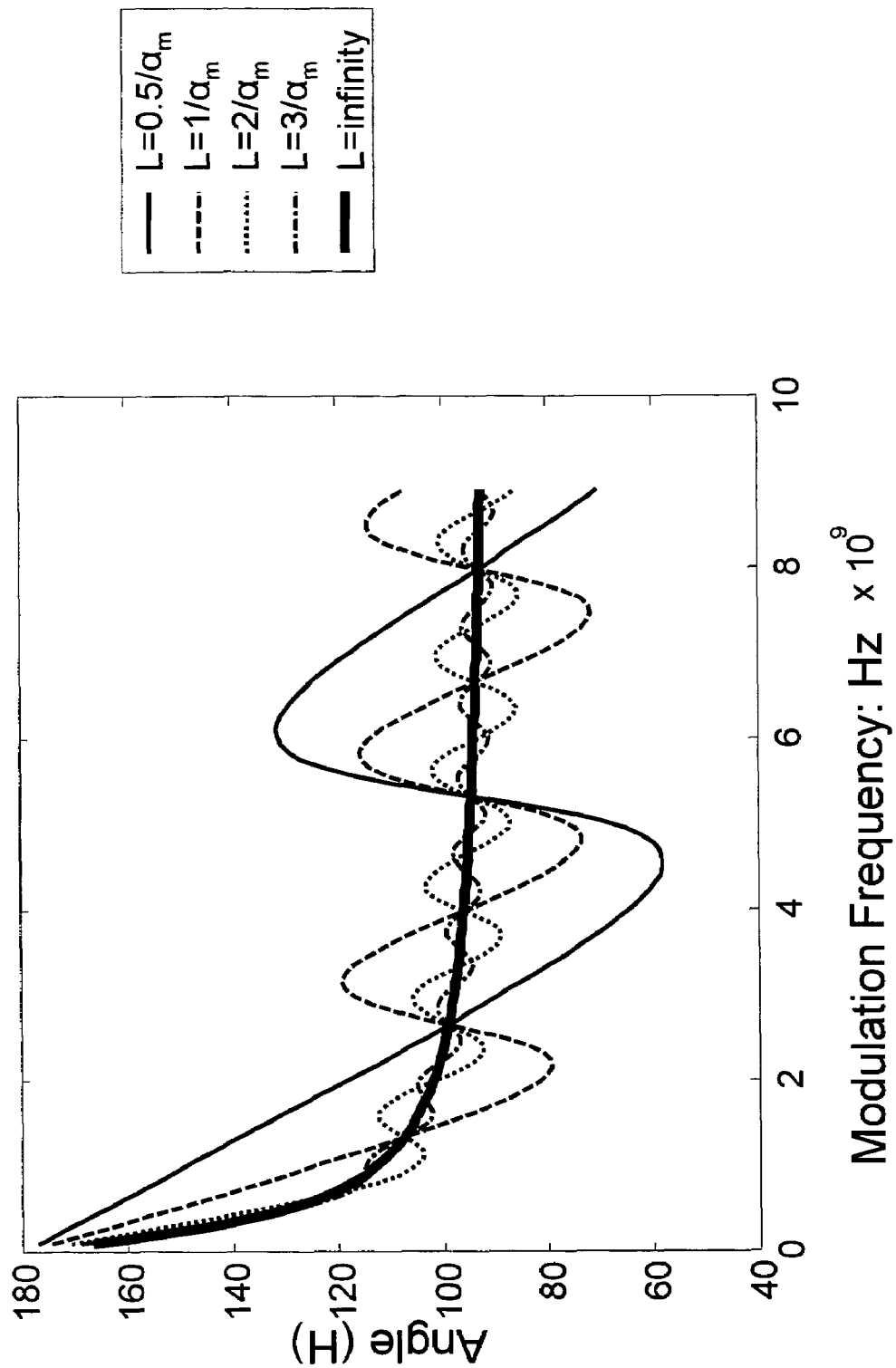
FIG. 3 is a graph of modulation phase versus modulation frequency for various lengths of an example ACP phase modulator.

FIG. 3 is a graph of modulation phase versus modulation frequency for various lengths, L, of an example ACP phase modulator. The modulation phase is represented in angle ($H_{ACP}(\omega)$) and the frequency if represented in Hertz (Hz). Similar to FIG. 2, the graph of FIG. 3 was calculated using a fixed value of attenuation, $\alpha_m$, equal to 50 NP/m. The phase was calculated for values of modulator length, L, equal to $L=0.5/\alpha_m$, $L=1/\alpha_m$, $L=2/\alpha_m$, $L=3/\alpha_m$, L=infinity. The graph of FIG. 3 also exhibits the persistent oscillation at the modulator resonance frequency, $f_r = 1/2\tau d$. As the length, L, increases, the oscillation diminishes, and when $L > 3/\alpha_m$, the modulator response is nearly identical to the monotonically decaying shape of an ideal ACP modulator with infinite L. Thus, as can be seen from FIG. 2 and FIG. 3, the modulator response is nearly identical to the monotonically decaying shape of an ideal ACP modulator with infinite L, when L is greater than 3 times the attenuation length (attenuation length=$1/\alpha_m$).

Figure 4:
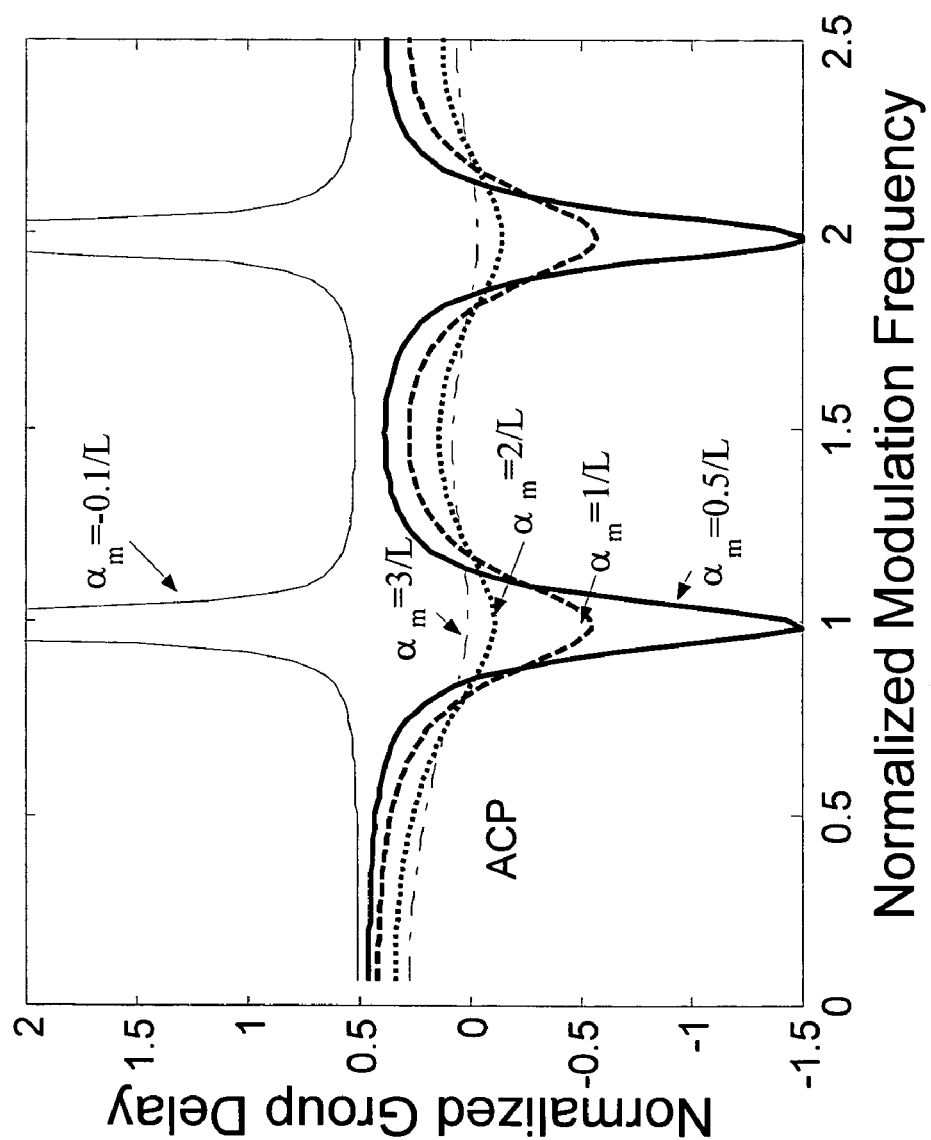
FIG. 4 is a graph of normalized group delay versus normalized frequency for an example ACP phase modulator.

FIG. 4 is a graph of normalized group delay versus normalized frequency for an example ACP phase modulator. Normalized coordinates are introduced for generality. Frequency is normalized by the modulator resonance frequency, $f_r$. Thus the normalized frequency is $f/f_r$. The group delay is normalized by the average traveling time of the optical field and the modulation field, $\tau_d$. The normalized group delay is $\tau/2\tau_d$. The length, L, of the modulator is standardized. The normalized group delay of the ACP modulator is a function of frequency, and has minimum values at the multiples of the resonance frequencies: $f_n = nf_r$ (n is an integer). These local minimum values of the normalized group delay intensify for lesser attenuation, and tend to extend to negative values of normalized group delay. Away from the resonance frequency values, as $\alpha_m$ vanishes, the normalized group delay of the ACP modulator approaches approximately 0.5. When increasing $\alpha_m$, the group delay diminishes at frequencies much higher than $f_r$. This indicates vanishing of propagation delay because the propagation delay of a low pass filter approaches the group delay in frequencies well above the filter cutoff. The case in which $\alpha_m = 0.1/L$ is also depicted in the graph of FIG. 4. When $\alpha_m = 0.1/L$, the modulation field as seen by the optical field slightly increases (instead of being attenuated). This can occur, for example, when the counter-propagating fields are not perfectly aligned. As seen in FIG. 4, when $\alpha_m = 0.1/L$, the group delay is enhanced near the modulator resonances.

Figure 5:
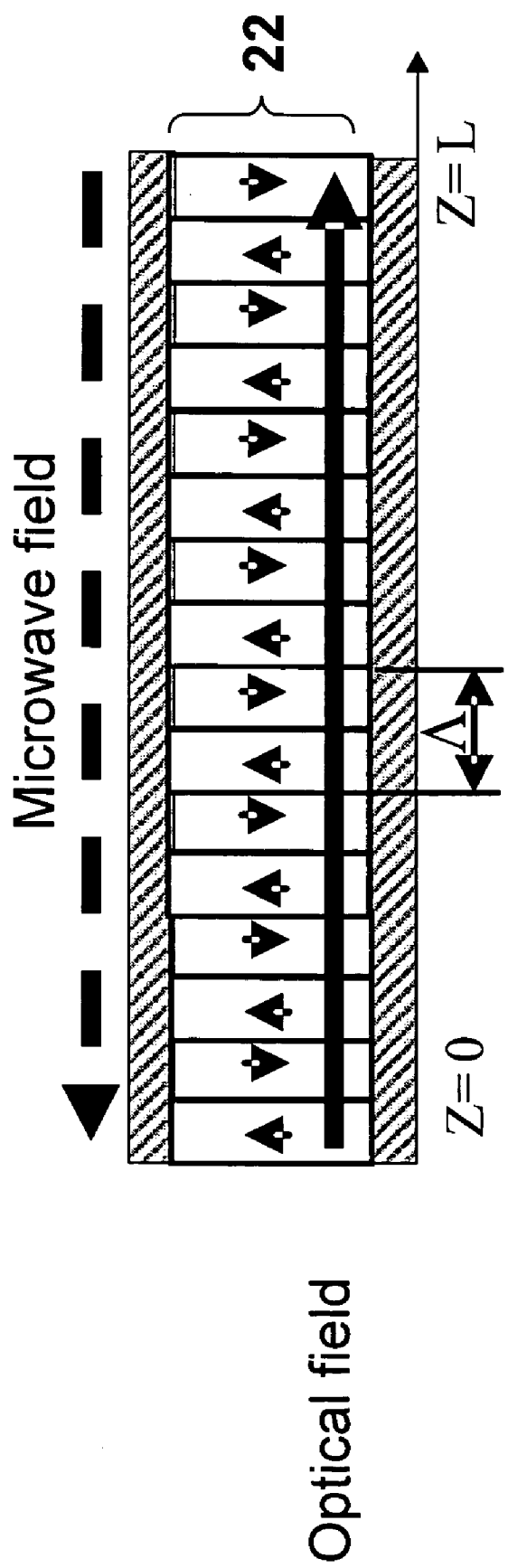
FIG. 5 is an illustration of an example ACP phase modulator implemented as a band-pass ACP phase modulator.

FIG. 5 is an illustration of an example ACP phase modulator implemented as a band-pass ACP phase modulator. The ACP phase modulator described up to this point has a low-pass frequency response. In an example embodiment, the ACP phase modulator also can be implemented as a band-pass phase modulator having a band pass frequency response. The ACP phase modulator can obtain a band-pass response by introducing periodical poling to the electro-optic medium as depicted by the alternating arrows 22, and thereby is able to operate at high microwave or millimeter wave frequencies. Periodic poling is accomplished by forming the electro-optic medium with layers of electro-optic material (e.g., crystal), wherein each layer has an alternate optical axis orientation. The optical energy propagates through the optical medium and the optical medium is periodically poled.

Introducing periodic pulling to the electro-optic medium allows the ACP phase modulator to yield a band-pass response. With the introducing periodic pulling, equation (7) has the form of equation (12) below:

$$\frac{\partial \phi(\omega, z)}{\partial z} + j\frac{\omega}{u} \cdot \phi(\omega, z) = \frac{\alpha(z)}{u} \cdot V_m(\omega, z), \quad (12)$$

where the $\alpha_z$ parameter has a form of a periodic function, and can be expanded to the Fourier series shown in equation (13).

$$\alpha(z) = \sum_{n=-\infty}^{\infty} \alpha_n \cdot e^{-i2\pi \cdot n \cdot (L-z)/\Lambda}, \quad (13)$$

where $\alpha_n$ is the Fourier coefficient and $\Lambda$ is the pulling period.

Upon substituting equation (13) and equation (1) into equation (12), the transfer function of the ACP modulator with periodic pulling can be determined. This transfer function is represented by equation (14).

$$H_{ACP\_Pulling}(\omega) = \sum_{n=-\infty}^{\infty} \alpha_n \cdot \frac{\alpha}{u} \cdot \frac{1 - e^{-[\gamma_m + j \cdot (\omega - n \cdot 2\pi \cdot u/\Lambda)/u]L}}{\gamma_m + j \cdot (\omega - n \cdot 2\pi \cdot u/\Lambda)/u} \quad (14)$$

Comparing equation (14) with equation (8), it is evident that with period pulling, the ACP modulator response (equation (8)) is translated to the frequencies determined by the pulling period: $n \cdot 2\pi \cdot \mu/\Lambda$. In order to obtain a band-pass response with pass-band near the frequency $u/\Lambda$, $\alpha_1$ to chosen at the dominant term by controlling $\alpha_2$. Also, similar to the low-pass ACP modulator, a lump-element band-pass response is obtained by letting the ACP modulator length, L, approach infinity.

Figure 6:
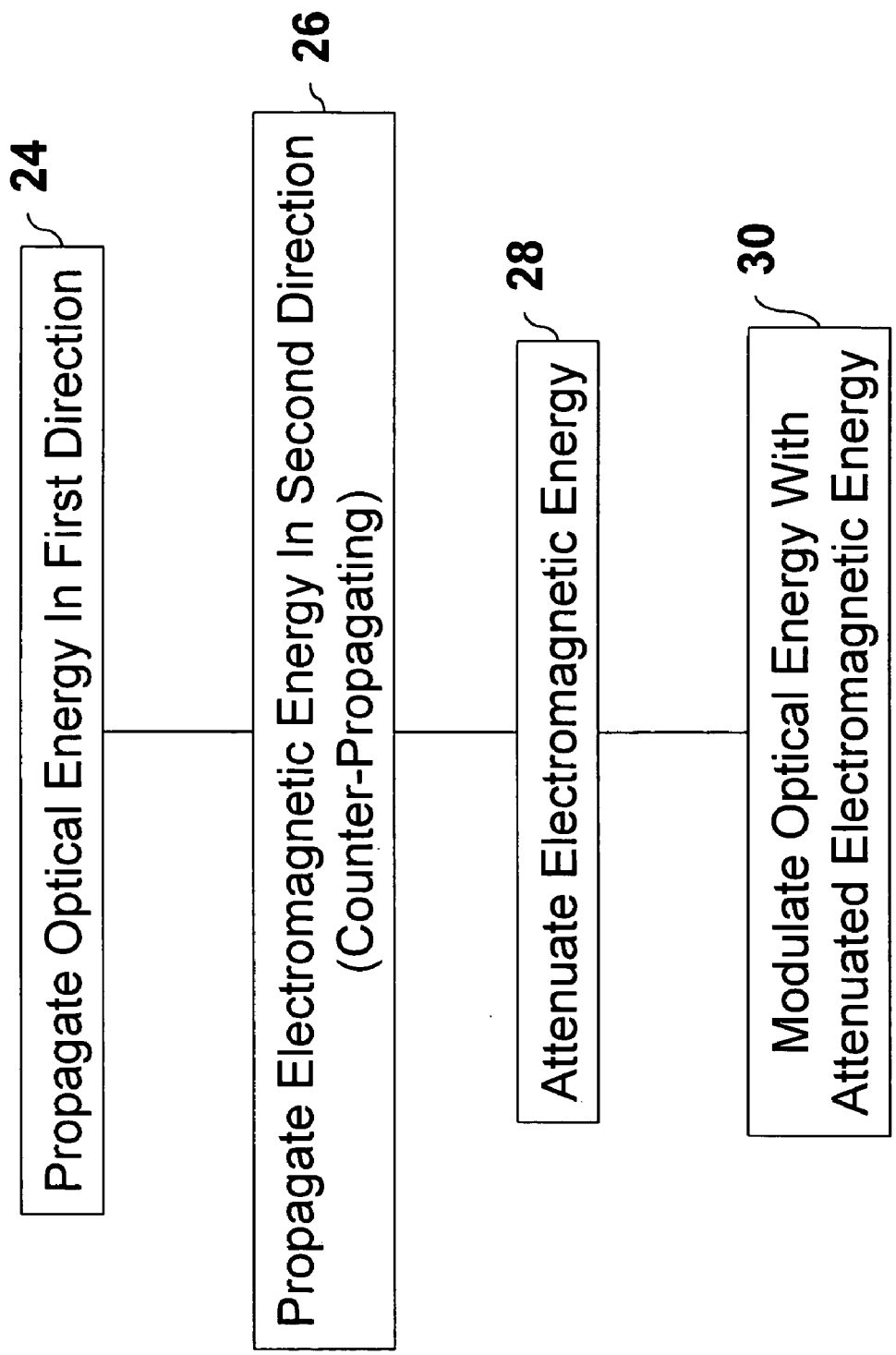
FIG. 6 is a flow diagram of an example process for modulating optical energy with attenuated, counter-propagating electromagnetic energy.

FIG. 6 is a flow diagram of an example process for modulating optical energy with attenuated, counter-propagating electromagnetic energy as described above. Optical energy is propagated in a first direction at step 24. Electromagnetic energy is counter-propagated at step 26. That is, the propagation direction of the optical energy is opposite the propagation direction of the electromagnetic energy. The electromagnetic energy is attenuated at step 28, and the optical energy is modulated by the attenuated electromagnetic energy at step 30. Modulating energy in accordance with the process described in FIG. 6 can result in zero propagation delay when the length of the modulator is longer than the attenuation length. In an example embodiment, the length of the modulator is at least three times greater than the attenuation length. Attenuation can be accomplished by any appropriate means. For example, the electromagnetic channel can comprise a composite attenuating material, the electromagnetic channel can comprise layered materials that provide attenuation (such as by placing a saline solution on the non-attenuating electrode as described below), and/or separate attenuating materials can be positioned in proximity to one another to provide attenuation.

As mentioned above, the ACP phase modulator is ideally suited to applications benefiting from a modulator having no propagation delay. One such application is a photonic phase locked loop because a photonic phase locked loop relies on tight tracking of the optical phase to perform linear phase demodulation. It is to be understood that application of the ACP phase modulator is not limited to applications benefiting from a modulator having no propagation delay. It is further to be understood that the description herein of the ACP phase modulator as applied to a photonic phase locked loop is merely one example and that the application of the ACP phase modulator is not limited thereto.

Figure 7:
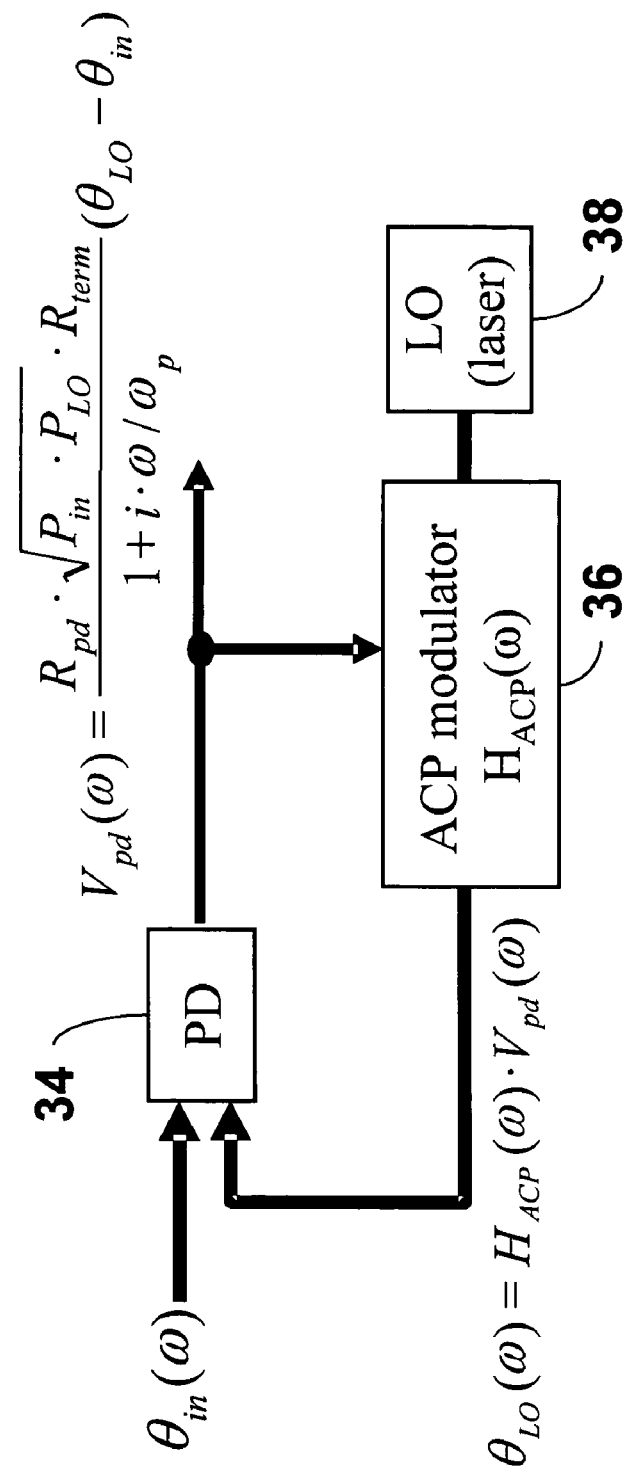
FIG. 7 is a diagram of an example photonic phase locked loop (PPLL) comprising an ACP phase modulator.

FIG. 7 is a diagram of an example photonic phase locked loop (PPLL) 32 comprising an ACP phase modulator 36. The description of the PPLL 32 herein is with reference to the ACP phase modulator 36 having a low-pass response (see equation (8)). It is to be understood that an ACP phase modulator having band-pass response also is applicable to a PPLL. The PPLL 32 comprises a photodetector (PD) 34, a local oscillator (LO) 38, and the ACP phase modulator 36. The phase of the incoming optical signal is denoted as $\theta_{in}$ and the phase of the optical signal from the local oscillator 38 at the output of the ACP phase modulator 36 is denoted as $\theta_{LO}$. The voltage at the output of the PD 34 is a function of frequency, $\omega$, and is denoted as $V_{pd}(\omega)$. The component of optical power at the output of the PD 34 corresponding to the phase of $\theta_{in}$ is denoted as $P_{in}$. The component of optical power at the output of the PD 34 corresponding to the phase of $\theta_{LO}$, is denoted as $P_{LO}$. The photodetector responsivity of the PD 34 is denoted as $R_{pd}$. The terminal resistance of the PD 34 is denoted as $R_{term}$. The bandwidth of the PD 34 is denoted as $\omega_p$, which is determined in part by the RC time constant of the PD 34. In the configuration depicted in FIG. 7, the PD 34 further functions as a loop filter.

The open loop gain the PPLL 32 is used to determine the linearity and stability of the PPLL phase demodulator. The open loop gain, denoted as $G(\omega)$ is determined in accordance with the output voltage, $V_{pd}(\omega)$, of the PD 34 and the transfer function, $H_{ACP}(\omega)$, of the ACP phase modulator 36, as represented in equation (8). The output voltage, $V_{pd}(\omega)$, is represented by equation (15) below.

$$V_{pd}(\omega) = \frac{R_{pd}\sqrt{P_{in} \cdot P_{LO}} \cdot R_{term}}{1 + j \cdot \omega/\omega_P}(\theta_{LO} - \theta_{in}) \quad (15)$$

Accordingly, the open loop gain, $G(\omega)$ is represented by equation (16) below.

$$G(\omega) = \left[ R_{pd} \cdot \sqrt{P_{in} \cdot P_{LO}} \cdot R_{term} \cdot \exp(-j\omega\tau_l) \cdot \frac{1}{1 + j \cdot \omega/\omega_P} \right] \cdot H_{ACP}(\omega), \quad (16)$$

where $\tau_1$ represents the propagation delay contributed by the loop components, PD 34 and interconnects, exclusive of the ACP phase modulator 36.

Although the propagation delay of the ACP phase modulator diminishes, its phase response is affected by the attenuation of the electromagnetic signal, which is accounted for in determining the stability of the PPLL. For the sake of simplicity an example ACP phase modulator having infinite length is analyzed. It is to be understood that the results from the analysis of the example ACP phase modulator having infinite length are also applicable to an ACP phase modulator having length, L, that is at least three times longer than the attenuation length.

Figure 8:
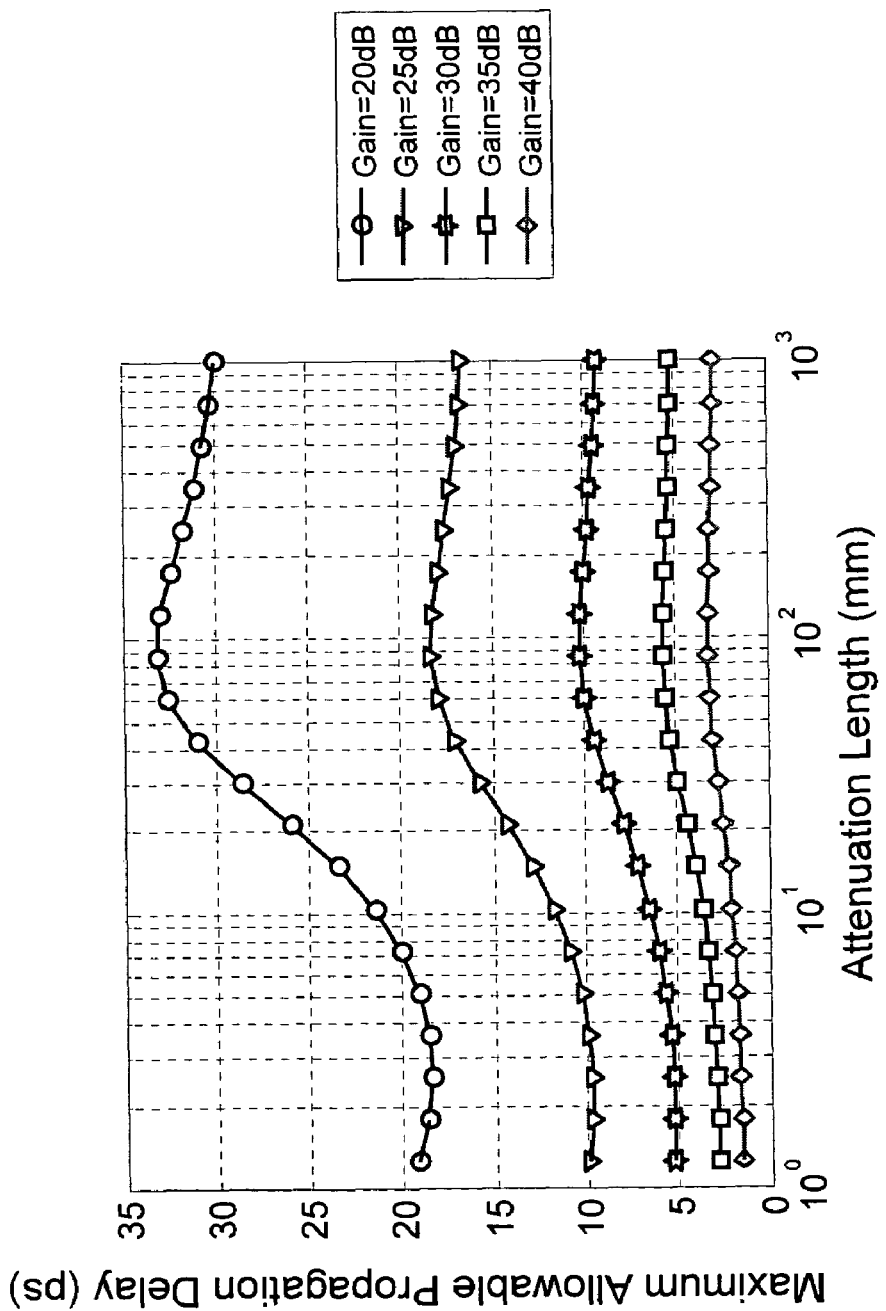
FIG. 8 is a graph depicting maximum allowable loop propagation delay as a function of attenuation length and open loop gain for a PPLL comprising an example ACP phase modulator.

FIG. 8 is a graph depicting maximum allowable loop propagation delay, $\tau_1$, in pico-seconds (ps), as a function of attenuation length in millimeters (mm) and open loop gain for a PPLL comprising an example ACP phase modulator. The maximum stable propagation delay, $\tau_1$, was calculated as a function of attenuation length and the minimum open loop gain for an example information bandwidth of 500 MHz and the PD bandwidth, $\omega_p$, equal to 1 GHz. As shown in the graph of FIG. 8, the loop latencies are achievable for very high loop gain. This is due, in part, to the example ACP phase modulator having infinite length and therefore not contributing to the propagation delay. This is also the case for an ACP phase modulator having a length that is at least three times longer than the attenuation length.

An example PPLL having specific parameters and comprising an ACP phase modulator, was analyzed. The parameters are listed in Table 1, below. The PPLL had a 30 dB open loop gain over a 500 MHz bandwidth. As seen in Table 1, the effective modulator thickness d is 13 micrometers (μm), which is approximately 12 μm. A modulator thickness of 12 μm is achievable in lithium niobate crystal (LiNbO3) waveguide devices. The modulator length and the attenuation length are determined in accordance with the open loop gain requirement.

TABLE 1

Parameters Used For An Example PPLL Implementation

| Parameter | Value |
| --- | --- |
| Transmission optical power | 300 mW |
| LO optical power | 300 mW |
| Modulator material E/O Coefficient, r | 31 pm/m (LiNbO$_3$) |
| Modulator effective thickness, d | 13 µm |
| PD sensitivity | 0.8 Amp/W |
| Loop propagation delay excluding the in-loop phase modulator | 5 ps |
| Information bandwidth | 500 MHz |
| Minimum open loop gain | 30 dB |

FIG. 9 comprises a Bode magnitude diagram (FIG. 9A) and a Nyquist diagram (FIG. 9B) of the open loop gain of a PPLL comprising an ACP phase modulator having a length of 30 mm, wherein the attenuation length is 100 mm, for a PPLL configuration having the parameters listed in Table 1. As shown in Bode diagram in FIG. 9A, the PPLL having the parameters listed in Table 1, comprising an ACP phase modulator having a length of 30 mm, and an attenuation length of 100 mm is capable of obtaining 30 dB gain over a 500 MHz bandwidth. Further, the Nyquist diagram in FIG. 9B shows that the configuration is stable because no portion of the diagram encompasses the (−1,0) point in the complex plane.

An experimental configuration of an ACP phase modulator was analyzed. The experimental configuration included a custom modified Mach-Zehnder (MZ) lithium niobate crystal (LiNbO$_3$) waveguide modulator. The MZ modulator was biased in quadrature, thus generating a photocurrent, I(t) ~sin(φ(t)), where φ(t) represents the modulator output phase. Under small signal approximation, the photocurrent is approximately equal to the modulator output phase; I(t)~φ(t). Thus, by measuring the transmission scattering parameter between the modulation port of the device and the PD output, the transfer function of the phase modulator can be determined.

In the experimental configuration, the ACP phase modulator electrode was a 3.7 cm long coplanar waveguide (CPW) fabricated on a lithium niobate crystal, LiNbO$_3$, substrate. A saline solution was applied over the CPW waveguide to introduce attenuation to the modulation field. The attenuation was adjusted by varying the salinity level of the saline solution. Two saline solution concentrations were utilized: a 2% saline solution and a 4% saline solution. The attenuation of the electrode was calculated and shown to be frequency dependent. On average, the 2% yielded 50 Np/m attenuation, which corresponds to an attenuation length of 20 mm. The 4% saline solution, on average, yielded 85 Np/m attenuation, which corresponds to an attenuation length of 12 mm.

Figure 10:
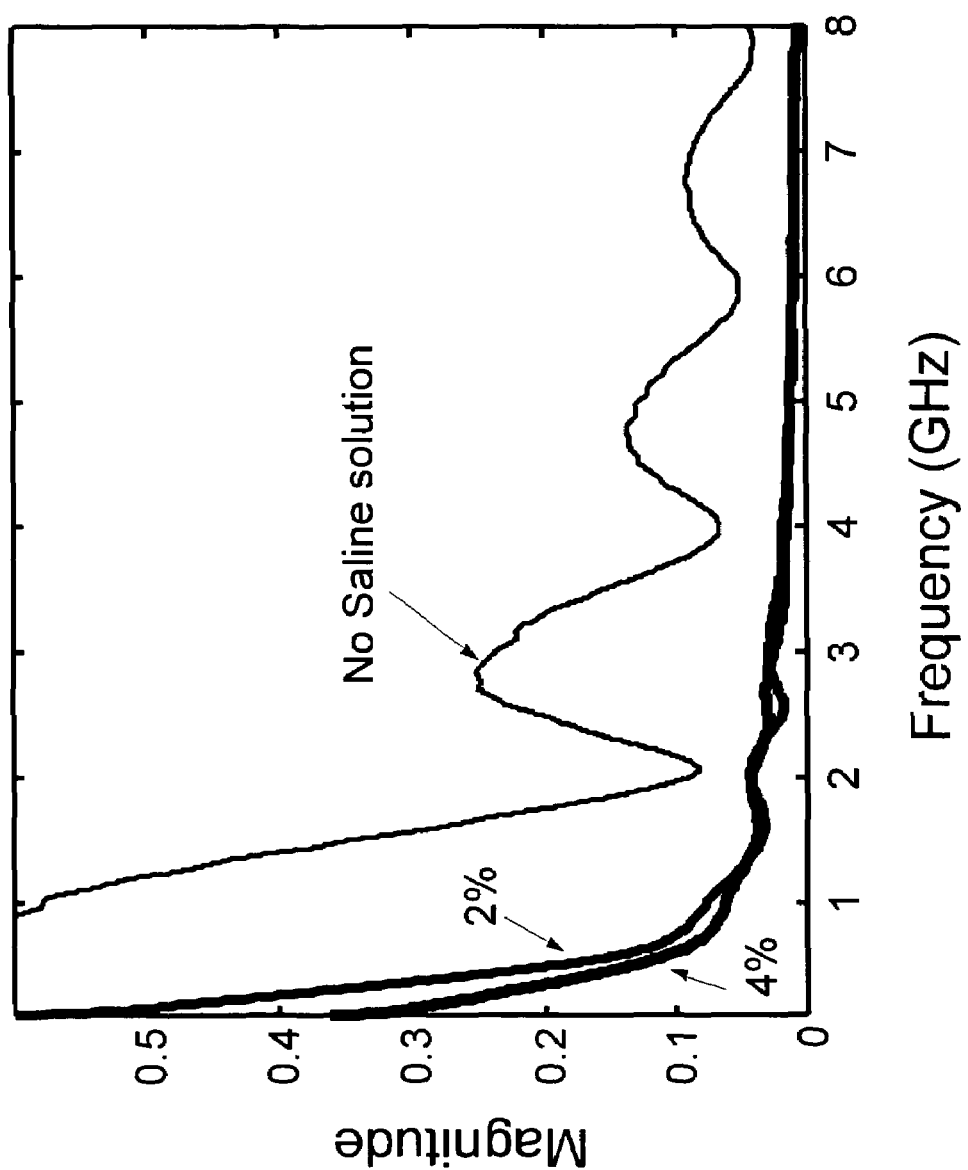
FIG. 10 is a graph of normalized magnitude response of an experimental ACP phase modulator versus frequency for the various values of attenuation achieved via various concentrations of saline solutions.

The experimental configuration was calibrated to eliminate various effects arising from the coaxial cables, optical fibers, driver amplifiers, the photodetector, and the like. The transfer function of the experimental ACP phase modulator was measured. FIG. 10 is a graph of normalized magnitude response of the experimental ACP phase modulator versus frequency for the various saline solutions. As shown in FIG. 10, when no saline solution was applied, the measured response was a approximately and ideal sinc (sin(x)/x) function. The valleys of the sinc function occur close to the resonance frequencies (~multiples of 2 GHz). The resonance frequencies were determined from the average propagation time of the modulation field and the optical field.

After applying the saline solutions, the velocity of the microwave field decreased due to the high dielectric constant ($\epsilon_r$=80) of saline, which is the same for both the 2% and the 4% solutions. This is reflected in the graph of FIG. 10 by the change in the resonance frequencies when the 2% and 4% saline solutions are applied. It is observed that the peaks and the valleys of the magnitude response start diminishing with increasing attenuation. With 4% salinity, the peaks and valleys are barely discernable. This behavior agrees well with the theoretical prediction for the curves of L=2/$\alpha_m$, and L=3/$\alpha_m$. The magnitude response was also analyzed versus frequency normalized by the modulator resonance frequency, and results were consistent.

Figure 11:
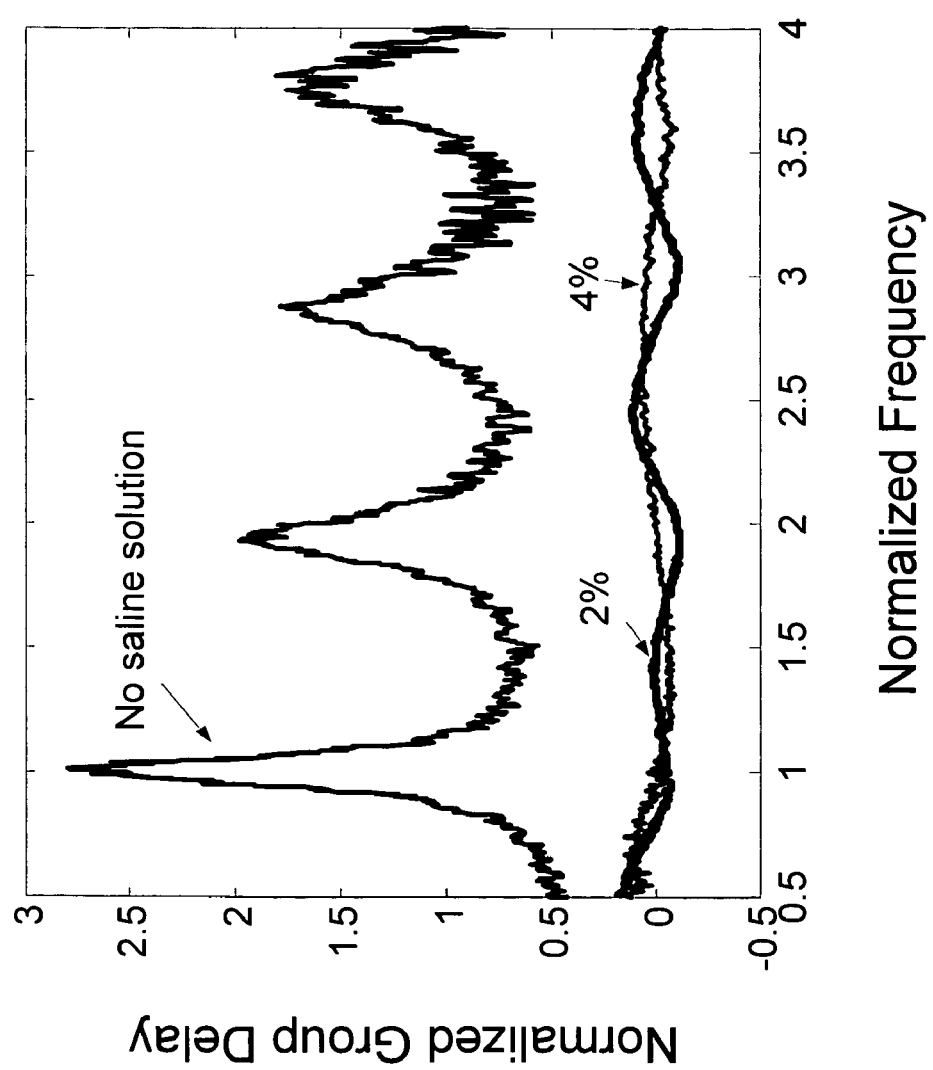
FIG. 11 is a graph of normalized group delay versus normalized frequency for the experimental ACP phase modulator for various values of attenuation achieved via various concentrations of saline solutions.

The group delay of the experimental ACP phase modulator also was measured. FIG. 11 is a graph of the normalized group delay versus normalized frequency for the experimental ACP phase modulator for the various saline solutions. For an accurate comparison with the theoretical results, the measured group delay is normalized by the modulator round trip time $\tau_d$. As shown in FIG. 11, in the absence of saline solution, the measured group delay is enhanced near the resonance frequencies. This is attributed to a slight misalignment between the optical waveguide and the electrode of the experimental configuration. The misalignment strengthens the interaction between the modulation field and the optical fields as the former propagates along the electrode, which is equivalent to increasing (amplifying) the modulation field. This leads to enhancement of the group delay near the resonance frequencies.

When the saline solutions are applied to introduce the desired attenuation, the enhancement in group delay near the resonances is reversed, and the group delay diminishes. With the 2% salinity level, the normalized group delay develops a fluctuation around 0 with amplitude of approximately 0.01. This correlates well with the theoretical calculations, which indicated that the normalized group delay fluctuates between −0.013 and 0.013. With 4% salinity level, this fluctuation is barely discernable and the normalized group delay decays to 0 as frequency increases, which suggests elimination of the propagation delay.

The various techniques described herein can be implemented in connection with hardware or software or, where appropriate, with a combination of both. Thus, the methods and apparatuses described herein, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The program code can be implemented in a high level procedural or object oriented programming language to communicate with a computer. The program(s) can be implemented in assembly or machine language, if desired. In any case, the language can be a compiled or interpreted language, and combined with hardware implementations.

The program code can be transmitted over a transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the receiving machine becomes an apparatus for practicing the invention. Additionally, any storage techniques can invariably be a combination of hardware and software.

While illustrative embodiments have various figures, it is to be understood that other similar embodiments can be used or modifications and additions can be made to the described embodiment for performing attenuating counter-propagating phase modulation without deviating therefrom. Therefore, attenuating counter-propagating phase modulation should not be limited to any single embodiment, but rather should be construed in breadth and scope in accordance with the appended claims.

What is claimed is:

1. A modulator comprising:
   an optical channel configured to propagate optical energy in a first direction; and
   an electromagnetic channel positioned adjacent to the optical channel, wherein:
      the electromagnetic channel is configured to propagate electromagnetic energy in a second direction opposite the first direction;
      the electromagnetic channel is configured to attenuate the electromagnetic energy for generating attenuated electromagnetic energy; and
      the modulator is configured to modulate the optical energy by the attenuated electromagnetic energy.

2. A modulator in accordance with claim 1, wherein a propagation delay of the modulator is equal to zero.

3. A modulator in accordance with claim 1, wherein a length of the modulator is greater than an attenuation length of the electromagnetic energy.

4. A modulator in accordance with claim 3, wherein the length of the modulator is at least three times greater than the attenuation length.

5. A modulator in accordance with claim 1, further comprising a first end and a second end opposite the first end, wherein the optical energy is applicable to one of the first end and the second end, and the electromagnetic energy is applicable to the other of the first end and the second end.

6. A modulator in accordance with claim 1, wherein the optical channel comprises an electro-optic material.

7. A modulator in accordance with claim 6, wherein the electro-optic material comprises at least one of lithium niobate crystal, potassium titanium oxide phosphate, lithium tantalate, and a semiconductor.

8. A modulator in accordance with claim 1, wherein the electromagnetic channel comprises a layered attenuating material.

9. A modulator in accordance with claim 1, wherein the electromagnetic channel comprises a composite attenuating material.

10. A modulator in accordance with claim 1, wherein the optical channel comprises a waveguide.

11. A modulator in accordance with claim 1, wherein the modulator is a phase modulator.

12. A modulator in accordance with claim 1, wherein the modulator comprises a low-pass filter response.

13. A modulator in accordance with claim 1, wherein the modulator comprises a band-pass filter response.

14. A modulator in accordance with claim 13, wherein the optical channel comprises alternately polarized domains.

15. A modulator in accordance with claim 14, wherein the optical channel is periodically poled to achieve the band-pass filter response.

16. A modulator in accordance with claim 1, wherein the electromagnetic energy comprises microwave energy.

17. A method for modulating optical energy with electromagnetic energy; the method comprising:
   propagating in a first direction, the optical energy;
   propagating in a second direction opposite the first direction, attenuated electromagnetic energy; and
   modulating the optical energy with the attenuated electromagnetic energy.

18. A method in accordance with claim 17, wherein a propagation delay of the modulated optical energy is equal to zero.

19. A method in accordance with claim 17, wherein the modulated optical energy comprises one of a low-pass frequency response and a band-pass frequency response.

20. A method in accordance with claim 19, further comprising periodically poling of a medium through which the optical energy propagates to achieve the band-pass frequency response.

21. A method in accordance with claim 17, wherein a propagation distance traveled by the electromagnetic energy to modulate the optical energy is greater than an attenuation length of the electromagnetic energy.

22. A method in accordance with claim 21, wherein the distance is at least three times greater than the attenuation length.

* * * * *